No. 747,415. Patented December 22, 1903.

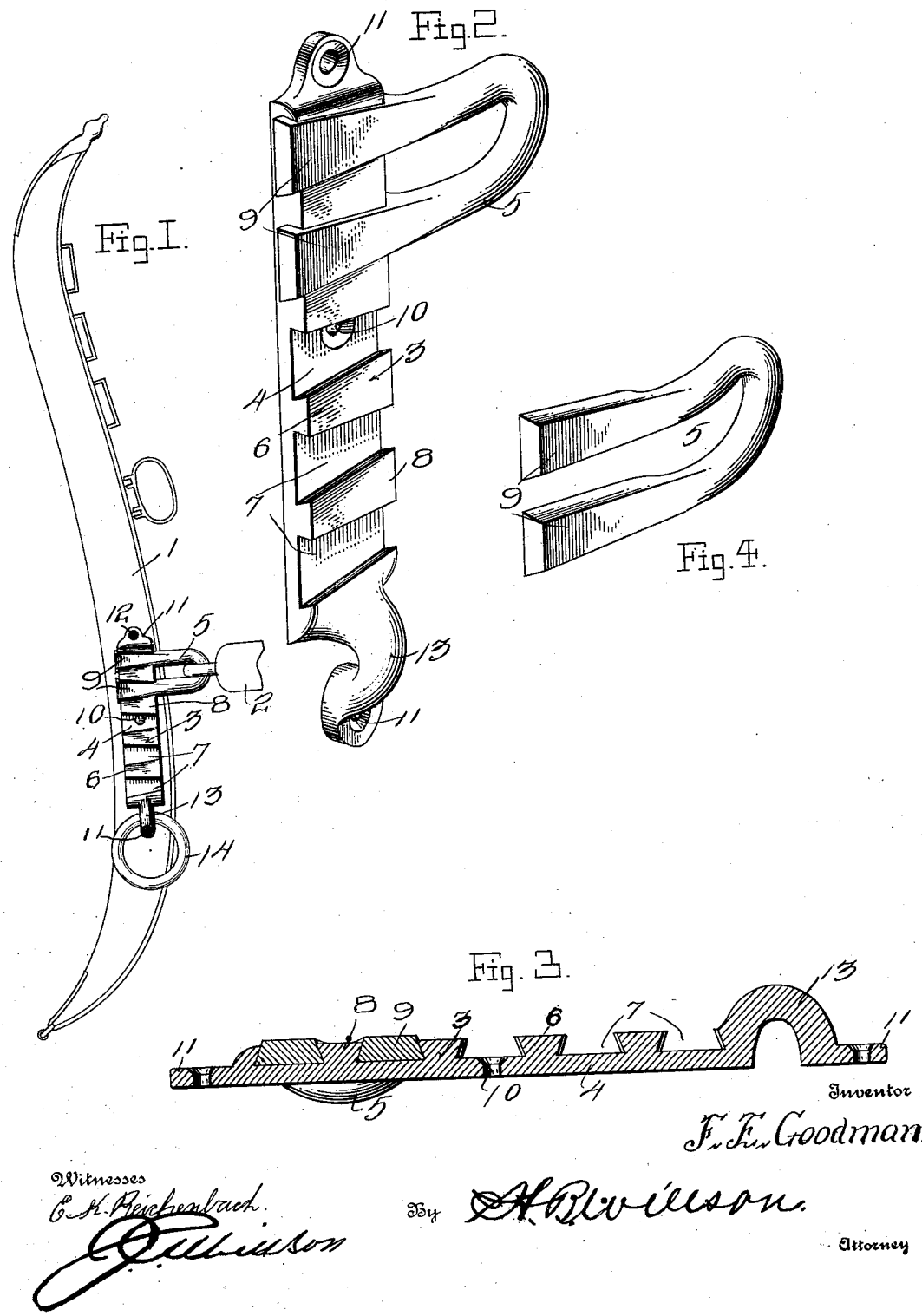

UNITED STATES PATENT OFFICE.

FOREST EDWARD GOODMAN, OF WACO, TEXAS.

HAME AND TRACE CONNECTOR.

SPECIFICATION forming part of Letters Patent No. 747,415, dated December 22, 1903.

Application filed May 14, 1903. Serial No. 157,157. (No model.)

*To all whom it may concern:*

Be it known that I, FOREST EDWARD GOODMAN, a citizen of the United States, residing at Waco, in the county of McLennan and State of Texas, have invented certain new and useful Improvements in Hame and Trace Connectors; and I do declare the following to be a full, clear, and exact description of the invention, such as will enable others skilled in the art to which it appertains to make and use the same.

This invention relates to improvements in adjustable connectors for fastening the hame-tugs or traces upon the hames.

The object of the invention is to provide a device of this character which is extremely simple, strong, and durable in construction, which is comparatively inexpensive of production, and by means of which the hame-tug or trace may be readily attached to, removed from, or adjusted upon the hame.

With these and other objects in view the invention consists of certain novel features of construction, combination, and arrangement of parts, as will be more fully described, and particularly pointed out in the appended claims.

Figure 1 is a side elevation of a hame, showing the application of the improved connector thereto. Fig. 2 is a perspective view of the device removed from the hame. Fig. 3 is a longitudinal sectional view through the same. Fig. 4 is a detail perspective view of the draft-clip.

Referring to the drawings in detail, the numeral 1 denotes a hame, 2 the end of a trace or hame-tug, and 3 the improved connector, which secures the trace to the hame. The connector comprises the plate 4, which is secured upon the hame, and the draft-clip 5, to which the trace or tug is attached.

The hame-plate 4, which is preferably a casting, consists of the rectangular portion 6, upon the upper or front face of which is formed a vertical row of transversely-disposed tapering dovetailed recesses or grooves 7. These recesses or grooves are tapered from the front or forward edge of the plate to the rear edge of the same, or, in other words, the recesses are of greater width at the forward edge than at the rear edge. The recesses are arranged at regular intervals, and thus form the projections or lugs 8 between them.

The draft-clip 5 consists of a loop or U-shaped iron, the ends 9 of which are tapered and dovetailed in cross-section to correspond in shape to the grooves or recesses 7, in which they are adapted to seat, as shown in the drawings. Owing to the location of the recesses or grooves 7 at regular intervals corresponding to the space between the ends 9 of the clip, it will be seen that said ends may be inserted in any two adjacent grooves or recesses, and thus permit of the adjustment of the clip upon the plate.

In applying the clip to the plate it will be seen that the narrow portions of the ends of the clip are placed in the two of the grooves or recesses, and the clip is then driven rearwardly to wedge the ends 9 of the same in the recesses. Owing to the dovetail and the taper of the ends 9 and recesses 7 the clip will be securely fastened to the plate, and the greater the draft or strain upon the clip the tighter the same will be wedged to the plate.

The hame-plate 4 may be secured upon the hame in any desired manner. I preferably provide an aperture 10 in the center of the plate and similar apertures in the ears 11, formed upon the ends of the plate, and through these apertures rivets, screws, or other fastening means 12 are passed to hold said plate upon the hame. The lower end of the plate above the ear 11 is reduced and bent to form a loop 13, in which an attaching-ring 14 is loosely held.

The application and operation of the invention will be readily seen upon reference to Fig. 1 of the drawings. As previously explained, the draft-clip may be readily applied to the plate in the proper position, and it may be as readily removed by a few blows upon the curved end of the same to drive it forwardly upon the plate. The hook or link upon the forward end of the trace or tug is engaged with the draft-clip, as seen in Fig. 1. It will be observed that the recesses 7 are open at front, so that only a partial endwise movement of the clip is required to apply and remove it, thus obviating the objection to those fastenings in which the recesses are open only at their ends and require a continuous tapering of the clip and a full endwise movement of the same in order to apply and release it.

When a metallic hame is used, if it is so desired the recesses or grooves may be formed in the hame itself instead of in a separate plate, and it will be understood that various other changes in the form, proportion, and the minor details of construction may be resorted to without departing from the principle or sacrificing any of the advantages of this invention.

From the foregoing description, taken in connection with the accompanying drawings, the construction and operation of the invention will be readily understood without requiring a more extended explanation.

Having thus fully described my invention, what I claim, and desire to secure by Letters Patent, is—

1. In a hame and trace connector, the combination of a hame-plate provided with a series of tapered, open-front, dovetailed grooves or recesses arranged at regular intervals, and a U-shaped draft-iron having tapered dovetailed ends adapted to engage adjacent grooves of said series and thereby adjustably secure said clip upon the plate, said dovetailed ends of the clip adapted to be released by a partial endwise movement of the same in said groove and to be withdrawn through the open fronts thereof.

2. A hame and trace connector, comprising a plate provided with means of attachment to a hame and with a series of regularly-arranged transverse, open-front, tapered, dovetailed grooves or recesses, said grooves or recesses forming spaced lugs having undercut side walls, and a U-shaped draft-clip provided with connecting ends to coöperate with said recesses, said connecting ends being tapered and of dovetail form to fit within the said dovetailed recesses and to have their dovetailed side edges interlock with the said undercut side walls of the lugs, whereby the clip is adapted to be released by a partial endwise movement of the tapered ends thereof within the grooves or recesses and to be withdrawn through the open fronts thereof, the construction being such that the dovetailed sides of the tapered ends of the clip bear at all times against three contiguous lugs of the hame-plate, thereby preventing tilting or canting of the clip when upward or downward pressure falls thereon, and insuring an accurate balancing of the clip upon the plate, thereby preventing it from binding and insuring its ready removal under endwise pressure from the grooves or recesses, substantially as described.

In testimony whereof I have hereunto set my hand in presence of two subscribing witnesses.

FOREST EDWARD GOODMAN.

Witnesses:
FRITZ HENJES,
RICHARD JURNEY.